United States Patent
Chen et al.

(10) Patent No.: US 10,684,649 B2
(45) Date of Patent: Jun. 16, 2020

(54) DISPLAY DEVICE

(71) Applicant: Qisda Corporation, Taoyuan (TW)

(72) Inventors: Chun-Jung Chen, Taoyuan (TW); Yung-Yeh Chang, Taoyuan County (TW); Shih-An Lin, New Taipei (TW); Hsiao-Yun Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/383,754

(22) Filed: Apr. 15, 2019

(65) Prior Publication Data

US 2020/0117236 A1    Apr. 16, 2020

(30) Foreign Application Priority Data

Oct. 16, 2018 (TW) .............................. 107136413 A

(51) Int. Cl.
*G06F 1/16* (2006.01)
*G09F 13/04* (2006.01)

(52) U.S. Cl.
CPC ........ *G06F 1/1637* (2013.01); *G09F 13/0413* (2013.01)

(58) Field of Classification Search
CPC ........................... G06F 1/1637; G09F 13/0413
See application file for complete search history.

(56) References Cited

U.S. PATENT DOCUMENTS

| 7,706,139 | B2* | 4/2010 | Kim ..................... | G06F 1/1601 361/679.21 |
| 2005/0174726 | A1* | 8/2005 | Bang ................... | H05K 5/0204 361/679.21 |
| 2012/0217860 | A1* | 8/2012 | Wu ...................... | G06F 1/1601 312/351.1 |
| 2012/0250284 | A1* | 10/2012 | Abe ..................... | G06F 1/1637 361/807 |
| 2014/0320746 | A1* | 10/2014 | Sato ..................... | H04N 5/64 348/725 |
| 2016/0033996 | A1* | 2/2016 | Lee ..................... | G06F 1/1626 361/679.26 |
| 2017/0325340 | A1* | 11/2017 | Schafer ............... | G06F 1/1601 |
| 2017/0371198 | A1* | 12/2017 | Kim .................... | H01L 51/5012 |

FOREIGN PATENT DOCUMENTS

| CN | 104269119 A | 1/2015 |
| JP | 2017211669 A | 11/2017 |

OTHER PUBLICATIONS

English translation of Oda et al. JP2017211669 provided in the IDS (Year: 2017).*
Office action of counterpart application by Taiwan IP Office dated Jun. 10, 2019.

* cited by examiner

*Primary Examiner* — Abhishek M Rathod

(57) ABSTRACT

A display device including a casing, a frame member, a plate member and a display panel is provided. The frame member includes a frame body and a protruding column disposed on the frame body and protruded in a direction from the frame body towards the casing. The plate member is disposed on the frame body and has an opening, which allows the protruding column to pass through, wherein the protruding column fixes relative position between the frame body and the plate member. The display panel is disposed on the frame body.

12 Claims, 8 Drawing Sheets

DISPLAY DEVICE

This application claims the benefit of Taiwan application Serial No. 107136413, filed Oct. 16, 2018, the subject matter of which is incorporated herein by reference.

BACKGROUND OF THE INVENTION

Field of the Invention

The invention relates in general to a display device, and more particularly to a display device with protruding column.

Description of the Related Art

Generally speaking, the display device includes a casing, a middle frame and a display module. The middle frame is interposed between the casing and the display module, and the casing and the display module are coupled together through the middle frame. In other words, the casing and the display module cannot be coupled together without using the middle frame. However, such coupling method will incur additional manufacturing cost and assembly process of the middle frame.

SUMMARY OF THE INVENTION

The invention is directed to a display device capable of resolving the generally known problems disclosed above.

According to one embodiment of the present invention, a display device is provided. The display device includes a casing, a frame member, a plate member and a display panel. The frame member includes a frame body and a protruding column disposed on the frame body and protruded in a direction from the frame body towards the casing, wherein the casing and the frame body are coupled together. The plate member is disposed on the frame body and has an opening, which allows the protruding column to pass through, wherein the protruding column fixes relative position between the frame body and the plate member. The display panel is disposed on the frame body.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
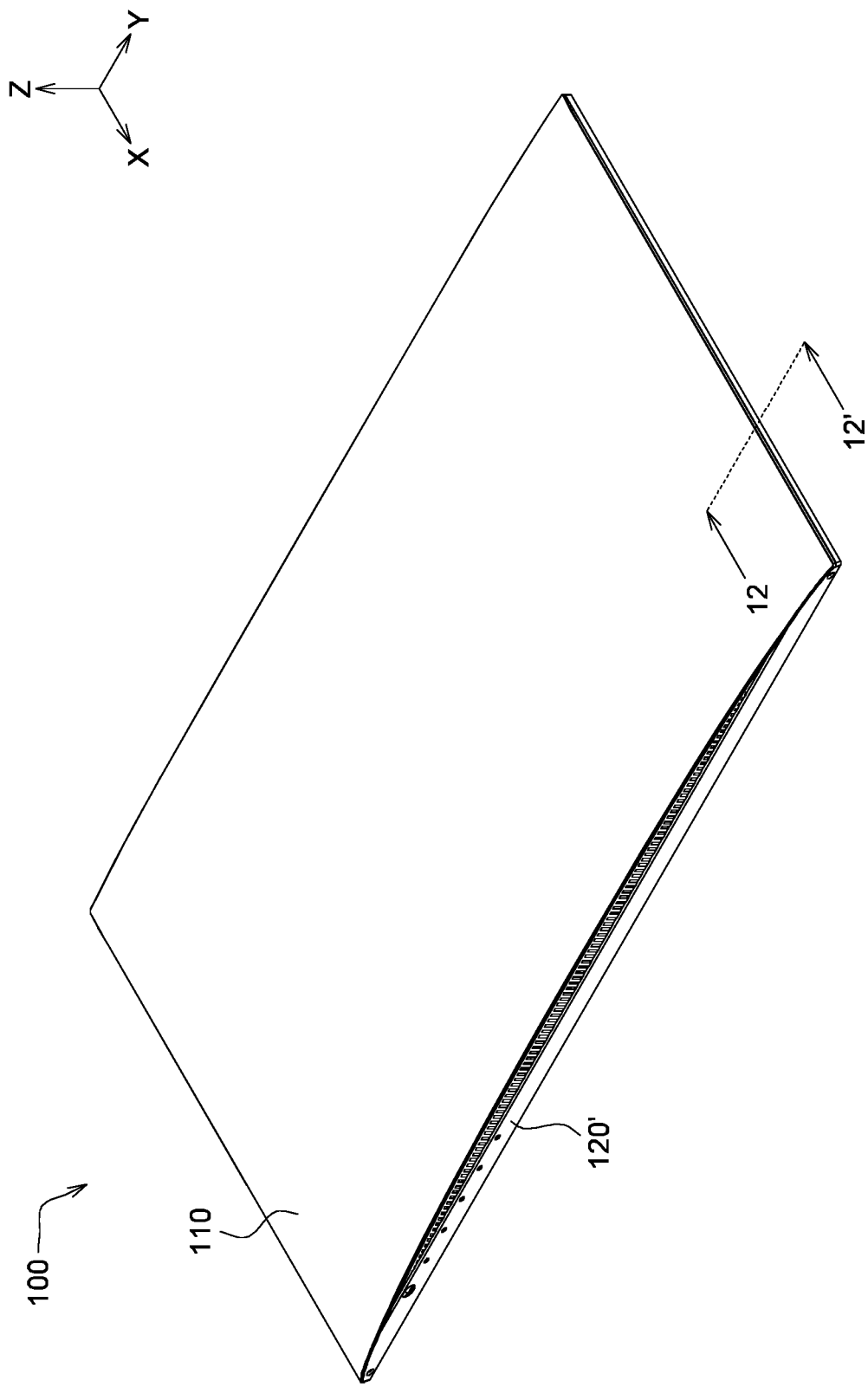
FIG. 1 is an assembly diagram of a display device according to an embodiment of the present invention.
Figure 2:
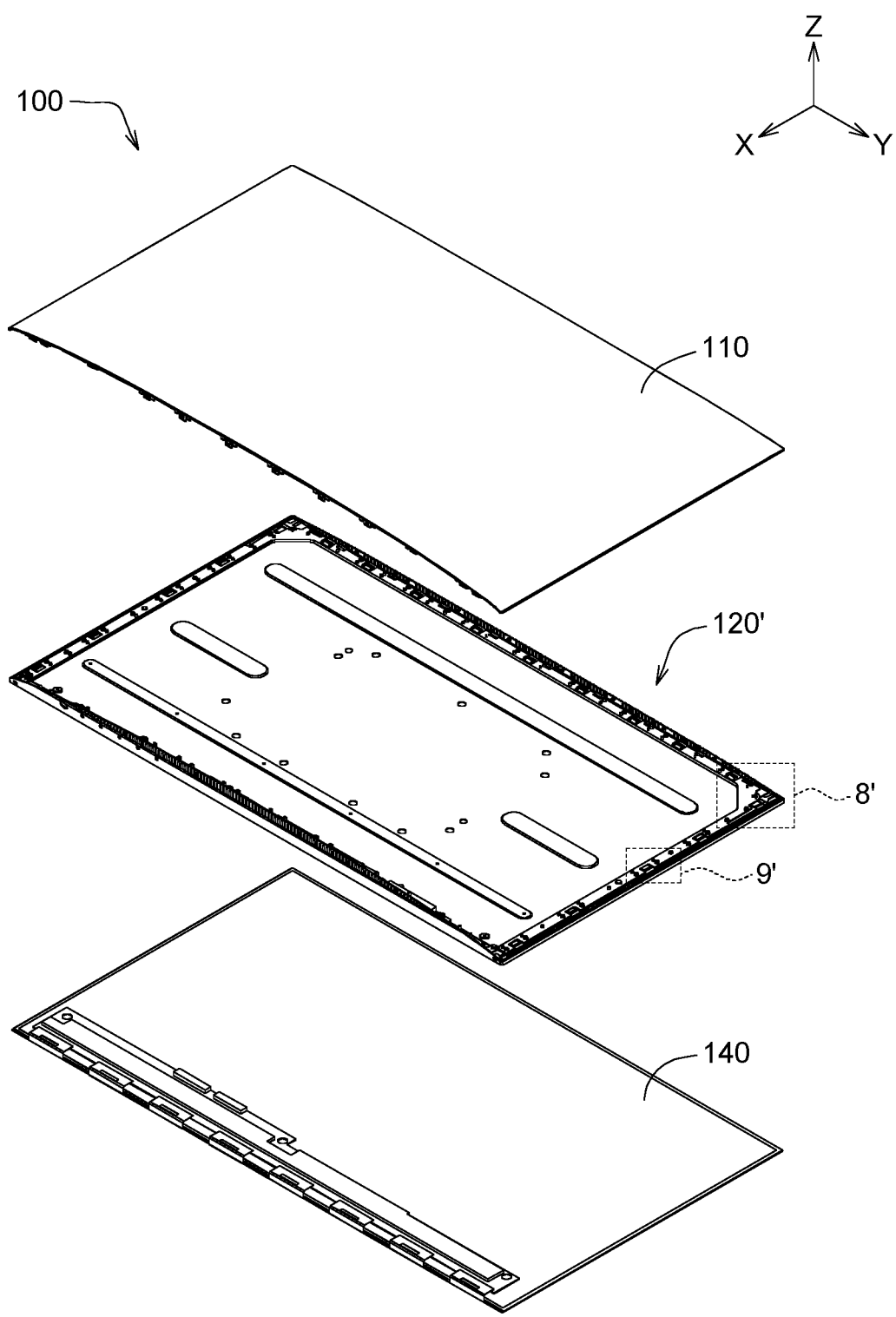
FIG. 2 is an explosion diagram of the display device of FIG. 1.
Figure 3:
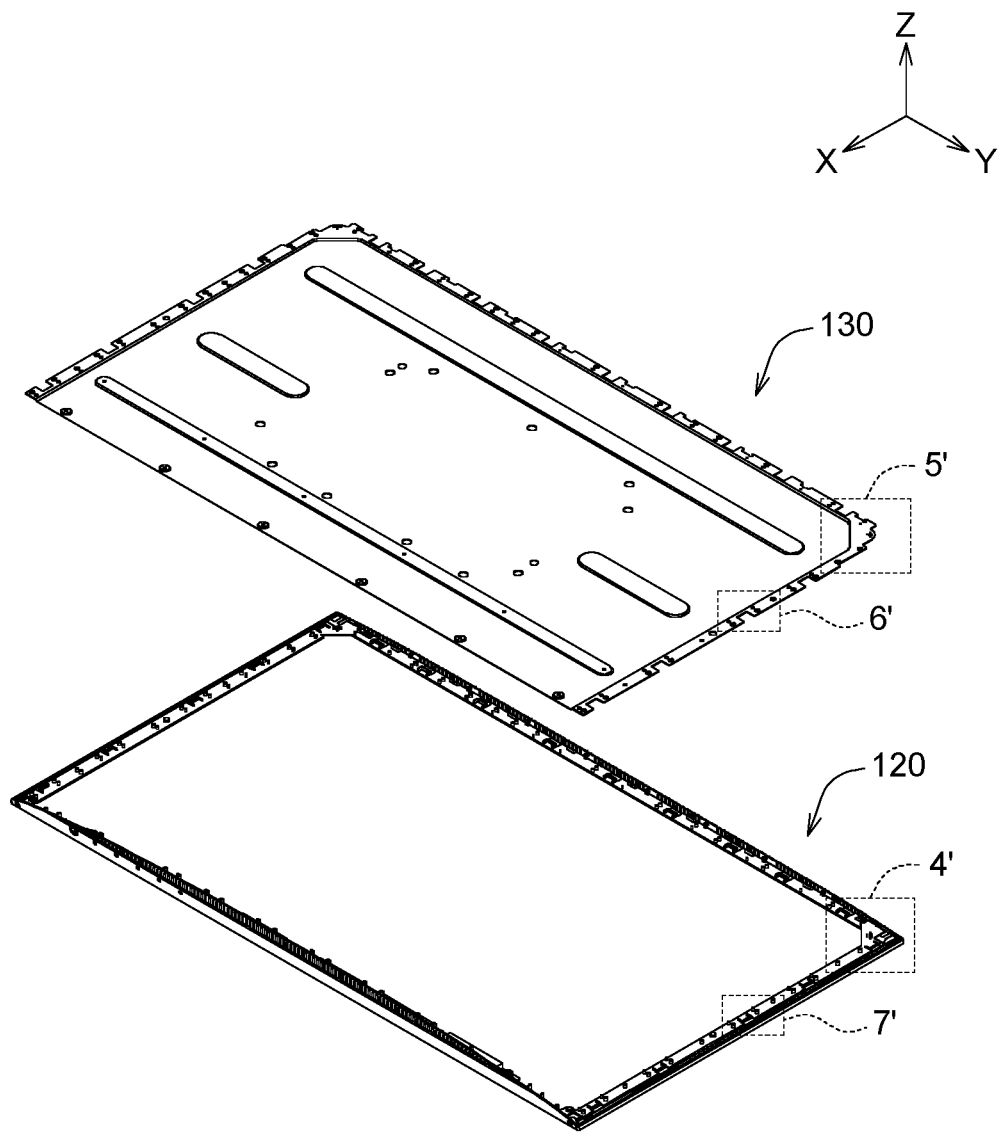
FIG. 3 is an explosion diagram of the frame member and the plate member of FIG. 2.
Figure 6:
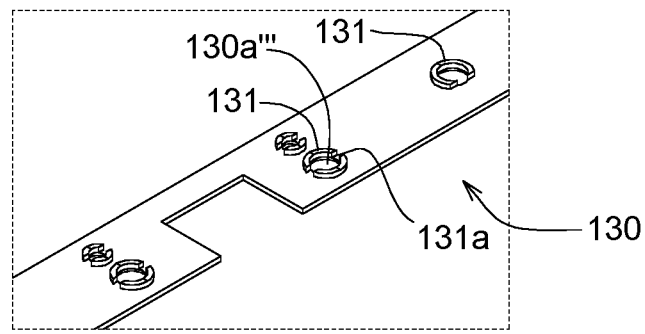
Figure 7:
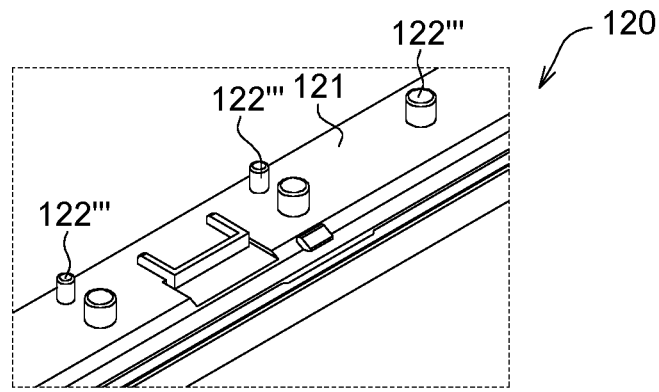
Figure 8:
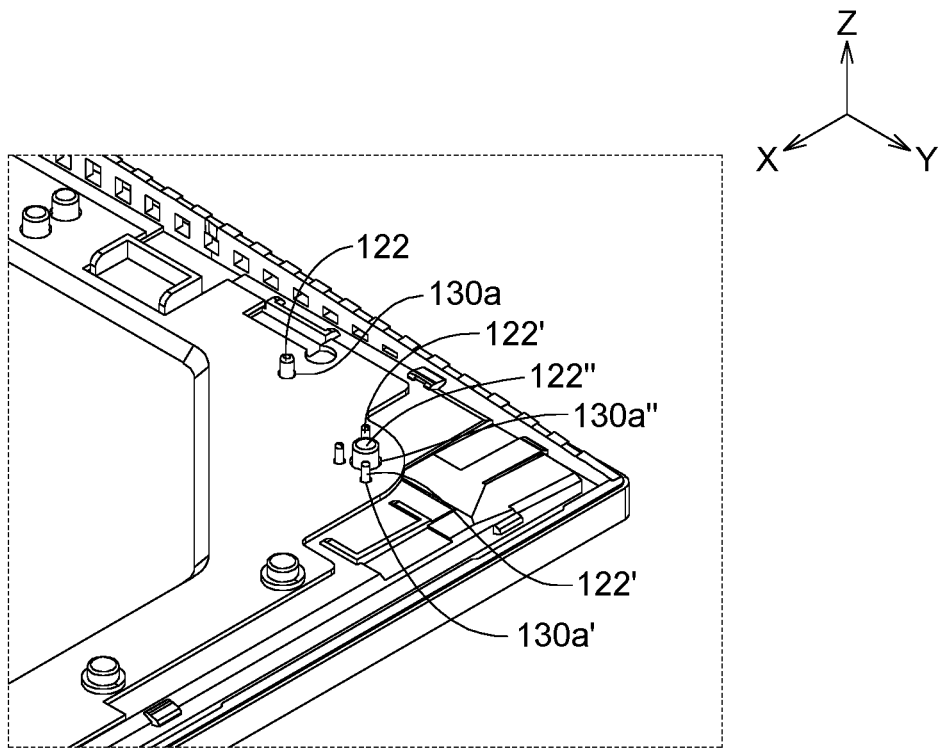
FIGS. 8 to 9 respectively are partial enlargements of the local regions 8' to 9' of FIG. 2.
Figure 9:
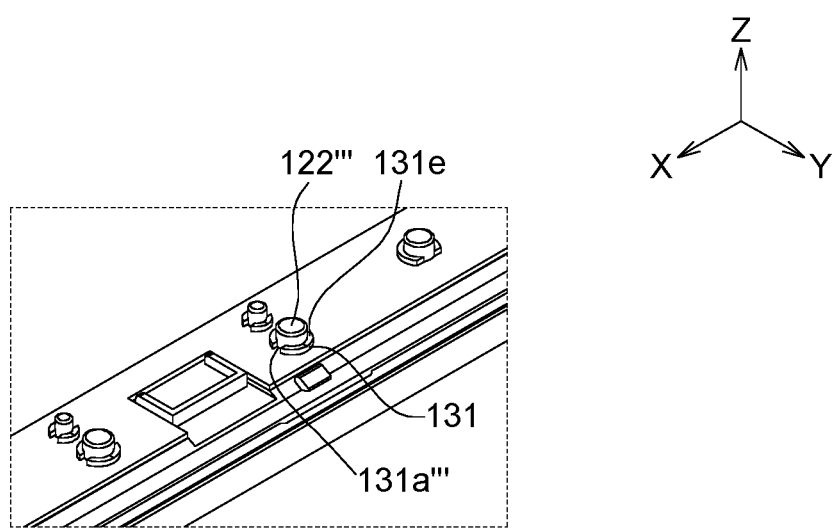

Refer to FIGS. 1 to 9. FIG. 2 is an explosion diagram of the display device 100 of FIG. 1. FIG. 3 is an explosion diagram of the frame member and the plate member of FIG. 2. FIGS. 4 to 7 respectively are partial enlargements of the local regions 4' to 7' of FIG. 3. FIGS. 8 to 9 respectively are partial enlargements of the local regions 8' to 9' of FIG. 2.

As indicated in FIGS. 2 to 3, the display device 100 includes a casing 110, a frame member 120, a plate member 130 and a display panel 140. In an embodiment, the frame member 120, the plate member 130 and the display panel 140 can be assembled as a pre-assembled member, that is, a display module. Then, the casing 110 and the pre-assembled member are assembled together. Thus, the assembly time of the display device 100 can be reduced. Besides, the display panel 140 and the casing 110 are respectively located on two opposite sides of the frame member 120. When the display device 100 is in use, the display surface of the display panel 140 is used as the front side of the display device 100 (facing the user), and the casing 110 is used as the rear side of the display device 100.

As indicated in FIGS. 4 to 7, the frame member 120 includes a frame body 121 and at least one protruding column 122 disposed on the frame body 121 and protruded in a direction from the frame body 121 towards the casing 110 (such as along the Z-axis). In an embodiment, the frame body 121 and protruding column 122 can be integrally formed in one piece or manufactured separately and then coupled together. The plate member 130 is disposed on the frame body 121 and has at least an opening 130a. In terms of the manufacturing process, the opening 130a can be formed using the punching process. As indicated in FIGS. 8 to 9, the opening 130a allows the corresponding protruding column 122 to pass through. The protruding column 122, after being hot-melted, can fix relative position between the frame body 121 and the plate member 130, such that the frame member 120 and the plate member 130 can be assembled as a pre-assembled member 120' as indicated in FIG. 2. In an embodiment, the plate member 130 can be realized by a metal plate or a plastic plate or formed of other materials.

Figure 4:
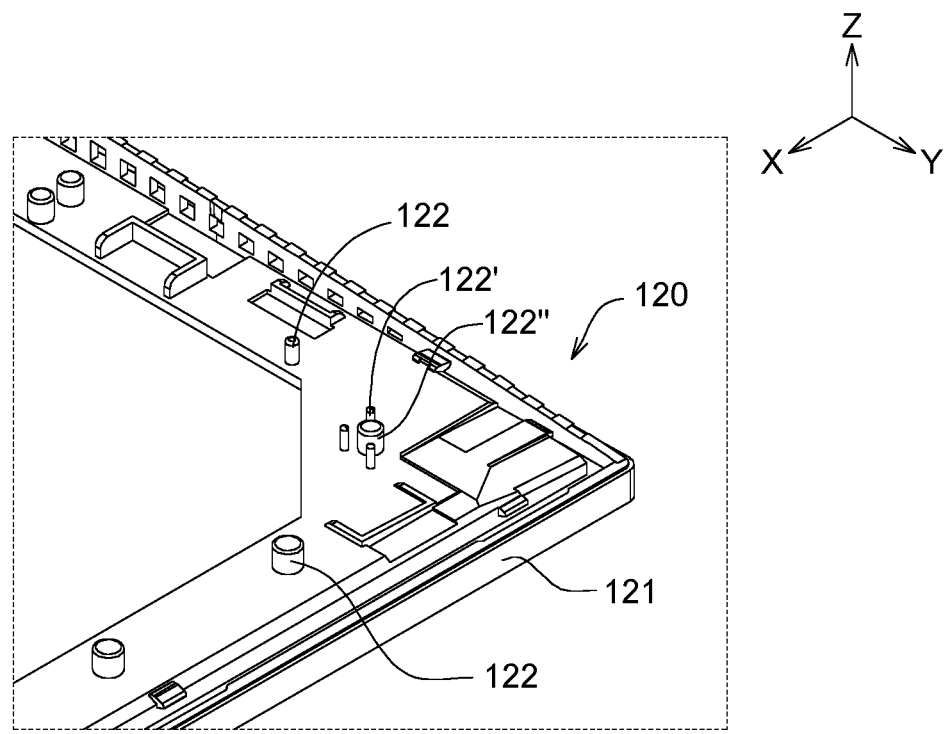
FIGS. 4 to 7 respectively are partial enlargements of the local regions 4' to 7' of FIG. 3.
Figure 5:
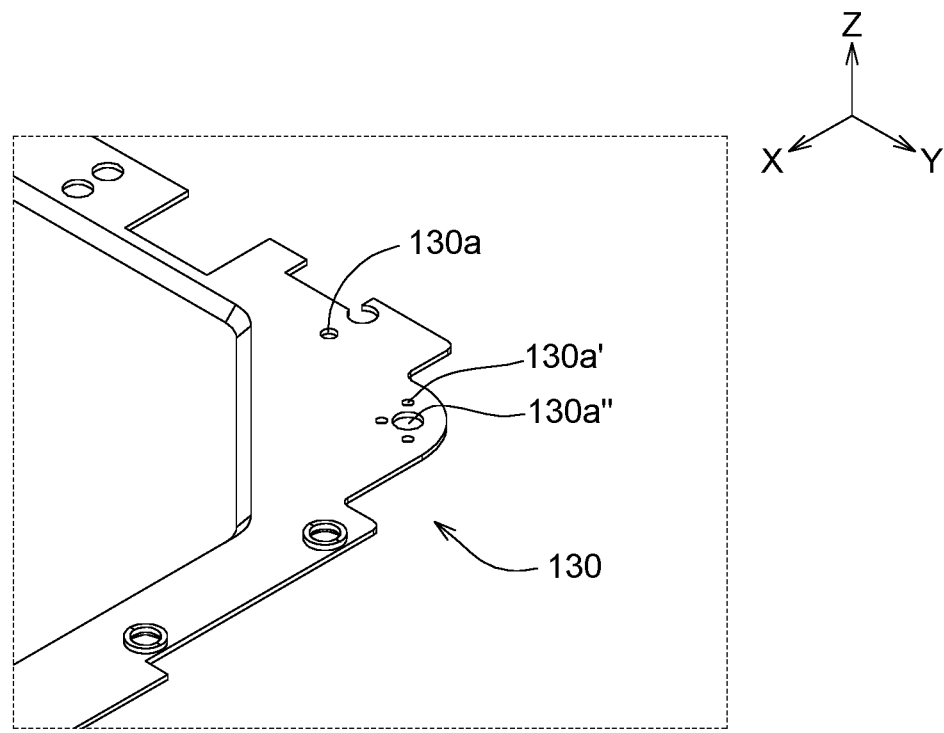

The frame member 120 may include a plurality of protruding columns 122, wherein the outer diameter of each protruding column 122 can be identical or different. As indicated in FIG. 4, the outer diameter of the protruding column 122' is smaller than that of the protruding column 122", and the inner diameter of the opening 130a' is smaller than that of the opening 130a", such that the protruding column 122' and the protruding column 122" can respectively pass through the opening 130a' and the opening 130a" as indicated in FIG. 8. Moreover, the protruding columns 122 can be disposed at an adjacent local region to enhance the bonding between the frame member 120 and the plate member 130 at the local region. To put it in greater details, the protruding columns, after being hot-melted, are interconnected at the local region, such that the bonding between the frame member 120 and the plate member 130 at the local region can be enhanced. However, the local region only allows one protruding column 122.

As indicated in FIGS. 6 and 7, the plate member 130 further includes at least one flange 131 extended along the edge of the corresponding opening 130a and protruded in a direction from the opening 130a''' towards the casing 110 (such as along the Z-axis). The flange 131 can be an open loop. For example, the flange 131 has at least one notch 131a, which divides the flange 131 into at least one segment and makes the flange 131 become an open loop. In other embodiments, the flange 131 can be a closed loop. That is, the flange 131 does not have any notch 131a. As indicated in FIG. 9, the protruding column 122''' can pass through the opening 130a''' and the flange 131 to protrude over the terminal surface 131e of the flange 131.

In terms of the manufacturing process, in an embodiment, the physical parts of the flange 131 and the plate member 130 can be integrally formed in one piece. For example, the opening 130a''' and the flange 131 can concurrently be formed on one plate using the pulling process (also referred as the budding process), wherein the flange 131 is a structure formed by the plate material extruded from the edge of the opening 130a''' in a pulling direction. Also, after the flange 131 in the shape of a closed loop is formed, at least one notch 131a can be formed on the flange 131 using the cutting or grinding process.

Although it is not illustrated in the diagrams, the protruding columns 122 can be realized by hollow protruding columns. In terms of the cross-sectional shape, the protruding columns 122 are not limited to cylinders, and can be polygonal columns (such as square columns, rectangular columns, and so on), or elliptical columns. In the present embodiment, the protruding columns 122 of the frame member 120 have different geometric patterns. However, in another embodiment, some or all of the protruding columns 122 of the frame member 120 can be the same geometric pattern.

Figure 10:
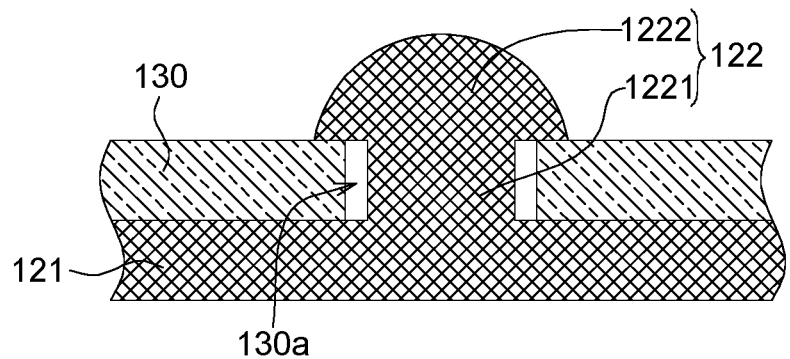
FIG. 10 is a structural diagram of the hot-melted protruding column of FIG. 8.
Figure 11:
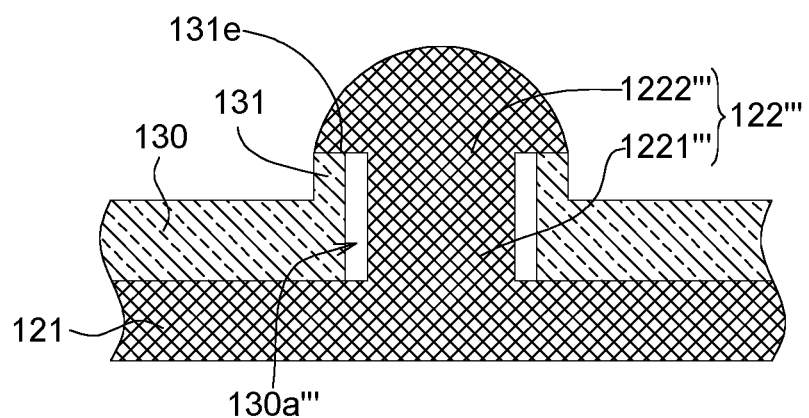
FIG. 11 is a structural diagram of the hot-melted protruding column of FIG. 9.

Refer to FIGS. 10 to 11. FIG. 10 is a structural diagram of the hot-melted protruding column 122 of FIG. 8. FIG. 11 is a structural diagram of the hot-melted protruding column 122 of FIG. 9. As indicated in FIG. 10, the protruding column 122 includes a column body 1221 and a hook body 1222 connected to the column body 1221, wherein the column body 1221 passes through the corresponding opening 130a. After the protruding column 122 of FIG. 8 is hot-melted, the terminal portion of the protruding column 122 is melted to form the hook body 1222 of FIG. 10. The hook body 1222 leans on the plate member 130 to fix relative position between the frame body 121 and the plate member 130. In other words, the plate member 130 is interposed between the hook body 1222 and the frame body 121, such that the plate member 130 and the frame member 120 will not be easily separated.

As indicated in FIG. 11, the protruding column 122''' includes a column body 1221''' and a hook body 1222''' connected to the column body 1221', wherein the column body 1221''' passes through the corresponding opening 130a'''. As disclosed above, after the protruding column 122''' of FIG. 9 is hot-melted, the terminal portion of the protruding column 122''' will be melted and form the hook body 1222''' of FIG. 11. The hook body 1222''' leans on the terminal surface 131e of the flange 131, and also can fix relative position between the frame body 121 and the plate member 130. In another embodiment, the hook body 1222''' can be extended to the outer later surface or inner lateral surface of the flange 131 and/or the top surface of the plate member 130. The plate member 130 is interposed between the hook body 1222''' and the frame body 121, such that the plate member 130 and the frame member 120 will not be easily separated. Although it is not illustrated in FIG. 11, a part of the hot-melted protruding column 122''' will flow to the notch 131a of the flange 131 (the notch 131a is illustrated in FIG. 6). After this part of the hot-melted protruding column 122''', which flows to the notch 131a, becomes cured, this cured part will form a part of the hook body 1222'''. Since the hook body 1222''' is partly located within the notch 131a, the bonding between the frame member 120 and the plate member 130 is enhanced along the XY-plane direction and the resistance against the frame member 120 and the plate member 130 rotating around the Z-axis is increased. The XY-plane is, for example, perpendicular to the Z-axis.

Although the formation of the protruding column of FIGS. 10 to 11 is exemplified by the hot-melting method, the embodiments of the present invention are not limited thereto. In another embodiment, the hook structure of the protruding column of FIGS. 10 to 11 can be formed during the manufacturing of the frame member 120. Thus, after the protruding column 122 of the frame member 120 is deformed and passes through the corresponding opening 130a of the plate member 130, the hook body 1222 of the protruding column 122 will immediately restore its initial state before deformation and immediately fix relative position between the frame body 121 and the plate member 130. Thus, extra hot-melting process is not needed.

Figure 12:
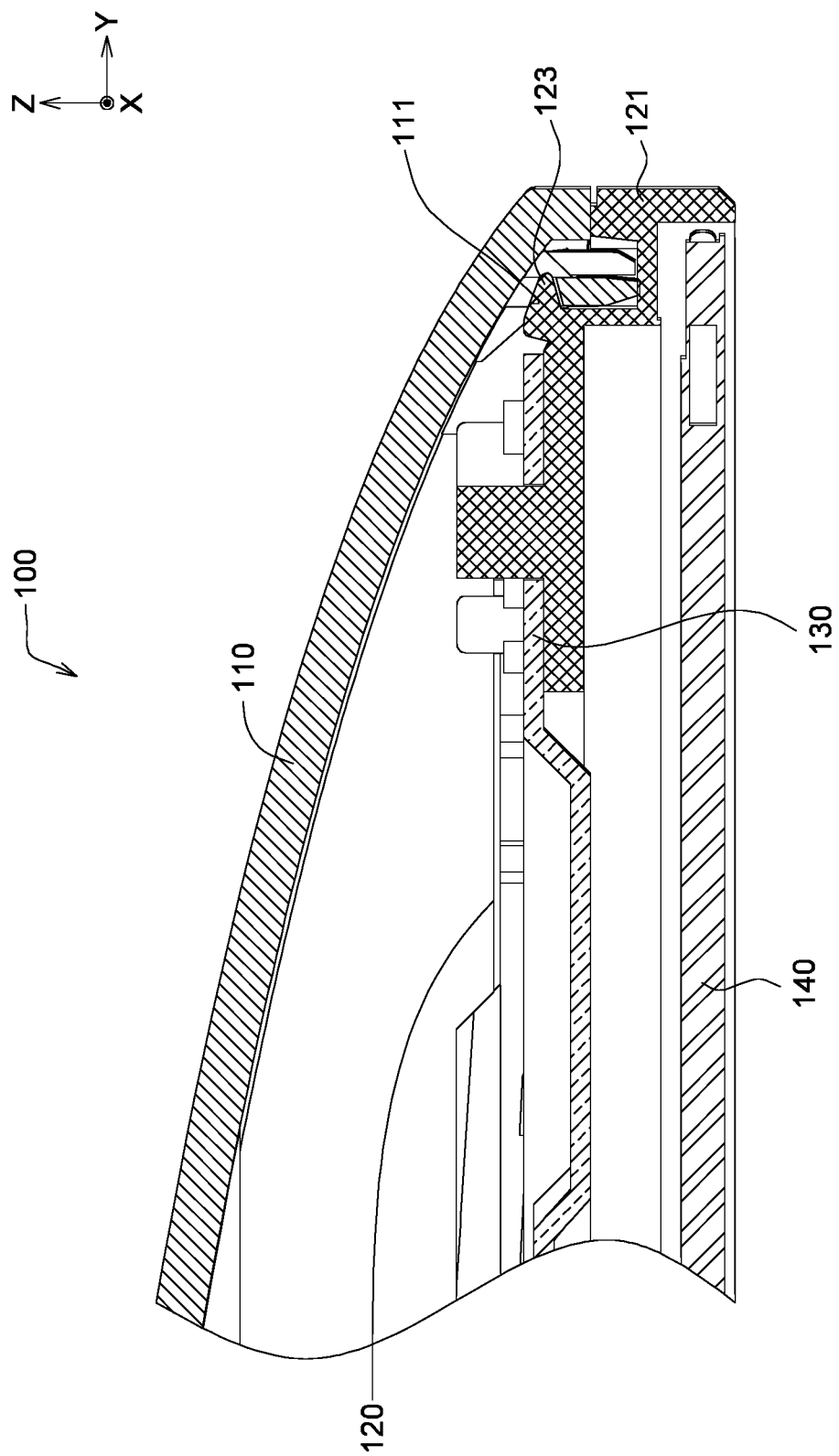
FIG. 12 is a cross-sectional view along a cross-sectional line 12-12' of the display device of FIG. 1.

Referring to FIG. 12, a cross-sectional view along a cross-sectional line 12-12' of the display device 100 of FIG. 1 is shown. The frame member 130 further includes at least one first engaging portion 123. The casing 110 further includes at least one second engaging portion 111. The frame member 120 and the casing 110 are engaged at the corresponding second engaging portion 111 through the first engaging portion 123 and become coupled. In the present embodiment, the first engaging portion 123 can be realized by an engaging hook, and the second engaging portion 111 can be realized by an engaging hole. In another embodiment, the first engaging portion 123 can be realized by an engaging hole, and the second engaging portion 111 can be realized by an engaging hook.

Furthermore, the display panel 140 can be disposed on the frame member 120. For example, the display panel 140 can be coupled with at least one part of the frame member 120. An adhesive can be applied to the places where the display panel 140 and the frame member 120 are not directly coupled to adhere relative position between the display panel 140 and the frame member 120. The method for coupling the display panel 140 and the frame member 120 is still within the scope of existing technologies, and the details are not repeated here. Also, the casing 110 and the frame member 120 can be directly coupled through the engaging between the first engaging portion 123 and the second engaging portion 111. According to the embodiments of the present invention, the coupling between the casing 110 and the display module (the display module is such as a pre-assembled member formed of the frame member 120, the plate member 130 and the display panel 140) does not require the use of the generally-known middle frame. Thus, the manufacturing cost, manufacturing time and assembly labor of the middle frame can be saved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
 a casing;
 a frame member, comprising a frame body and a protruding column, wherein the protruding column is disposed on the frame body and protruded in a direction from the frame body towards the casing, and the casing and the frame body are coupled together;

a plate member disposed on the frame body and has an opening, wherein the opening allows the protruding column to pass through, and the protruding column fixes relative position between the frame body and the plate member; and a display panel disposed on the frame body, wherein the casing and the display panel are respectively located on two opposite sides of the plate member.

2. The display device according to claim 1, wherein the protruding column comprises a hook body and a column body connected to the hook body, the column body passes through the opening, and the hook body leans on the plate member to fix relative position between the frame body and the plate member.

3. The display device according to claim 1, wherein the plate member further comprises a flange extended along the edge of the opening and protruded in a direction towards the casing.

4. The display device according to claim 3, wherein the flange is a closed loop.

5. The display device according to claim 3, wherein the flange has a notch within which the protruding column is partly located.

6. The display device according to claim 3, wherein the protruding column comprises a hook body and a column body connected to the hook body, the column body passes through the opening, and the hook body leans on the terminal surface of the flange to fix relative position between the frame body and the plate member.

7. The display device according to claim 3, wherein the frame member comprises a first engaging portion, the casing comprises a second engaging portion, the frame member and the casing are engaged in the second engaging portion and coupled together through the first engaging portion.

8. The display device according to claim 7, wherein one of the first engaging portion and the second engaging portion is an engaging hook, and the other one of the first engaging portion and the second engaging portion is an engaging hole.

9. The display device according to claim 1, wherein the plate member is a metal plate.

10. The display device according to claim 1, wherein the plate member is a plastic plate.

11. The display device according to claim 1, wherein the casing and the frame member are directly coupled together.

12. The display device according to claim 1, wherein the display panel and the frame member are directly coupled together.

* * * * *